(12) United States Patent
Sharma et al.

(10) Patent No.: US 7,602,758 B2
(45) Date of Patent: Oct. 13, 2009

(54) METHOD TO OBTAIN FRIENDLY NAMES FOR BLUETOOTH DEVICES

(75) Inventors: Om Sharma, Kirkland, WA (US); Doron J. Holan, Seattle, WA (US); Kenneth D. Ray, Redmond, WA (US); Louis J. Giliberto, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 29 days.

(21) Appl. No.: 11/465,076

(22) Filed: Aug. 16, 2006

(65) Prior Publication Data

US 2006/0282517 A1 Dec. 14, 2006

Related U.S. Application Data

(63) Continuation of application No. 10/087,452, filed on Mar. 1, 2002, now Pat. No. 7,110,382.

(51) Int. Cl.
*H04Q 7/24* (2006.01)

(52) U.S. Cl. .................. 370/338; 455/41.2; 711/123

(58) Field of Classification Search .............. None
See application file for complete search history.

(56) References Cited

U.S. PATENT DOCUMENTS

| 7,110,382 B2 * | 9/2006 | Sharma et al. ............ 370/338 |
|---|---|---|
| 7,216,109 B1 * | 5/2007 | Donner ..................... 705/64 |
| 7,260,638 B2 * | 8/2007 | Crosbie .................... 709/229 |
| 2004/0044727 A1 | 3/2004 | Abdelaziz et al. |
| 2004/0202132 A1 | 10/2004 | Heinonen et al. |
| 2004/0213409 A1 | 10/2004 | Murto et al. |
| 2005/0073522 A1 * | 4/2005 | Aholainen et al. ......... 345/440 |

FOREIGN PATENT DOCUMENTS

WO    WO 02/15527    2/2002

* cited by examiner

*Primary Examiner*—Duc C Ho
(74) *Attorney, Agent, or Firm*—Wolf, Greenfield & Sacks, P.C.

(57) ABSTRACT

A method and apparatus to decrease the amount of time it takes to obtain friendly names of Bluetooth devices is presented. A name server caches friendly names for devices that it has acquired from other devices or from other name servers. The name server is any device that caches friendly names of Bluetooth devices and that makes the friendly names available to other devices. A requesting device determines if a name server has responded to an inquiry command. If a name server has responded, the device gets the friendly names the name server has cached and requests the friendly names of devices that responded that have not been cached by the name server. Identification of a name server is accomplished by embedding a marker in the friendly name field after the null character to indicate that the device is a name server.

20 Claims, 4 Drawing Sheets

METHOD TO OBTAIN FRIENDLY NAMES FOR BLUETOOTH DEVICES

CROSS-REFERENCE TO RELATED APPLICATIONS

This application is a continuation of U.S. patent application Ser. No. 10/087,452, filed Mar. 1, 2002, now U.S. Pat. No. 7,110,382 entitled "A METHOD TO OBTAIN FRIENDLY NAMES FOR BLUETOOTH DEVICES". The entirety of the aforementioned application is incorporated herein by reference.

FIELD OF THE INVENTION

This invention relates generally to communication between Bluetooth devices and, more particularly, relates to methods to determine Bluetooth friendly names.

BACKGROUND OF THE INVENTION

There are a significant number of wireless technologies in the marketplace today. One standard for short range wireless technology is called Bluetooth. Bluetooth is a Radio Frequency (RF) specification for short-range, point-to-multipoint voice and data transfer. Bluetooth can transmit through solid, non-metal objects and its nominal link range is from 10 cm to 10 m, but can be extended to 100 m by increasing the transmit power. It is based on a low-cost, short-range radio link, and facilitates ad hoc connections for stationary and mobile communication environments.

The Bluetooth wireless technology allows users to make connections between communication devices such as mobile phones and desktop and notebook computers. Finding and making use of services in these environments is becoming increasingly important due to the continued growth in wireless technologies as seen by the proliferation of mobile computing devices and also due to the merging of wireless technologies and computer technologies. These services can include basic services such as printing, faxing, paging, etc., more complex services such as video conferencing and teleconferencing, and any other type of service that a service provider may provide.

Bluetooth utilizes a Host Controller Interface (HCI) that provides mechanisms to determine the capabilities (i.e., services) that Bluetooth devices can provide. The HCI has a mechanism called Inquiry to determine which Bluetooth devices are in range. When a Bluetooth device runs an Inquiry, Bluetooth devices within range respond and the requesting device receives one or more Inquiry Result events. Each Inquiry Result contains a list that includes the MAC (Media Access Control) address (i.e., the Bluetooth Device address BD_ADDR) class of device, and other information about each Bluetooth device that responded to the Inquiry. The requesting device is limited in what can be done with the information because the information merely indicates what a device's abilities are (e.g., cell phone, cordless phone, laptop, desktop workstation, etc.). Without further information, it is difficult to distinguish one Bluetooth device from another Bluetooth device.

To overcome this difficulty, the Bluetooth specification provides for user-friendly names (e.g., Joe's cellphone, printer in Room 210, etc.) to enable the user to distinguish between devices. A user must request each Bluetooth device for its friendly name using the Remote Name Request command. The result of a Remote Name Request is a friendly name field, which is a UTF-8 (Uniform Transformation Format) encoded descriptive name of a Bluetooth device. The length of friendly name field is 248 bytes long and if the friendly name is shorter than 248 bytes, the end of the friendly name is indicated by a null character. Multiple retries may be required for a Remote Name Request command to succeed. As a result, the total time it takes to find the friendly names of devices in a Bluetooth rich environment can take several minutes.

BRIEF SUMMARY OF THE INVENTION

The present invention provides a method to decrease the time it takes to determine the friendly names of Bluetooth devices. A name server is used that caches the friendly names of the Bluetooth devices that it has queried or otherwise obtained. When another device wants to know the friendly names of devices that responded to its Inquiry, the device searches to find a name server in the list of devices that responded to the Inquiry. Once the name server is found, the device obtains the friendly names that the name server has cached and requests the friendly names of devices that the name server does not have cached. In a Bluetooth rich environment, the likelihood of quickly finding a name server increases significantly, which results in a reduction in the time it takes to determine the friendly names of Bluetooth devices that responded to the Inquiry.

In one embodiment, the name server is identified by providing a marker that is embedded in the friendly name of the name server. The marker is placed after the null character in the friendly name field. Other information about the name server can also be placed in the friendly name field.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
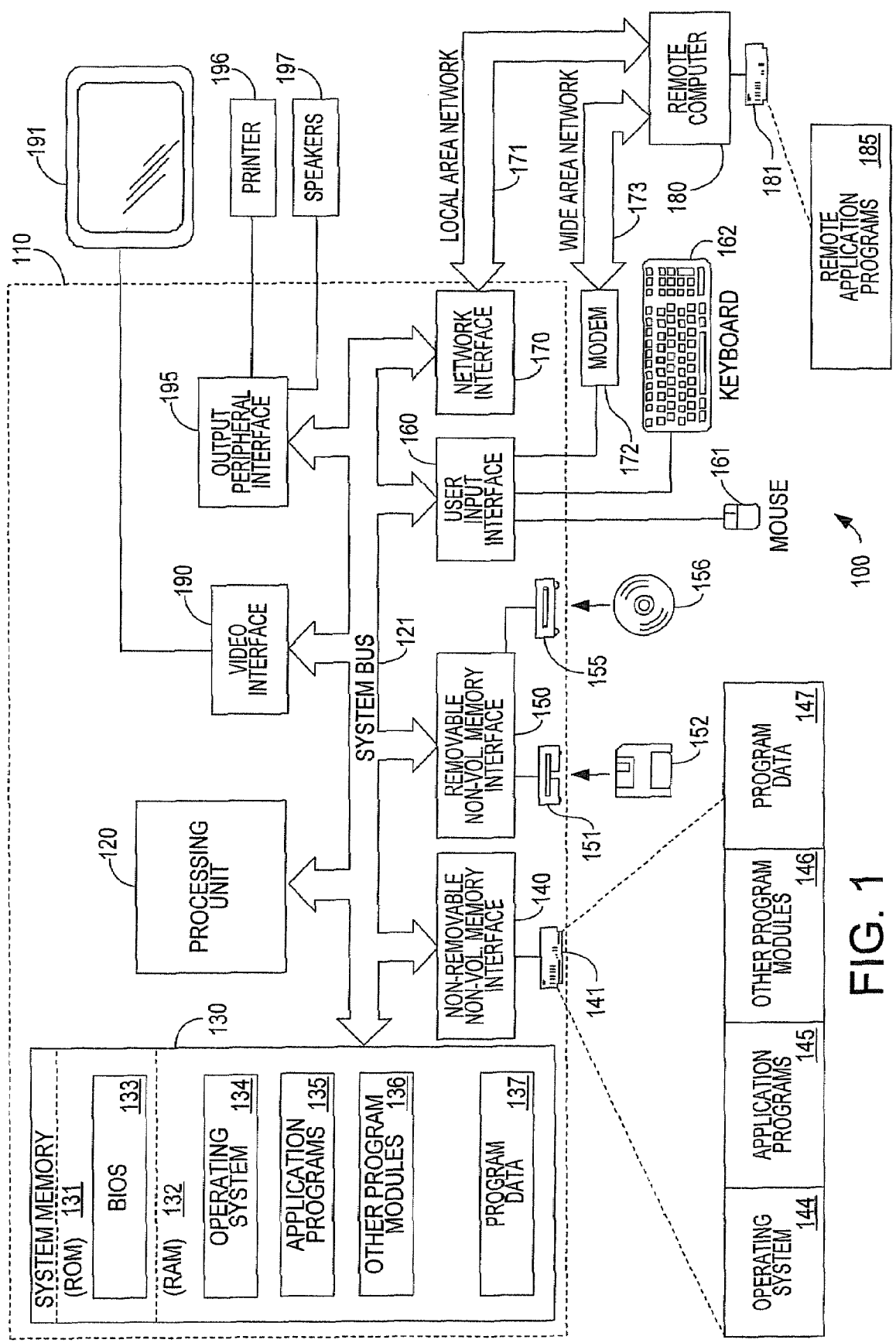
FIG. 1 is a block diagram generally illustrating an exemplary computer system on which the present invention resides.

As previously indicated, the Bluetooth specification provides for user friendly names (e.g., Joe's cellphone, laserjet printer in Building 54 Room 210, etc.) to enable the user to distinguish between devices. A user must request each Bluetooth device for its friendly name using the Remote Name Request (RNR) command. The RNR typically takes two to five seconds to complete per device and multiple requests must be done serially, which can result in a total time of several minutes to find the friendly names of Bluetooth devices. The present invention provides a method to speed up finding the friendly names of Bluetooth devices that respond to an Inquiry. In the description that follows, a name server is described that caches the friendly names of Bluetooth devices that it has queried or that it has obtained from other name servers. When a device performs an Inquiry and wants to know the friendly names of devices that respond to the Inquiry, the device determines if a name server has responded. If a name server has responded, the device gets the friendly names the name server has cached and requests the friendly names of devices that responded that have not been cached by the name server. The use of the name server significantly reduces the time needed to determine all the friendly names of Bluetooth devices that responded in Bluetooth rich environments.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 1 10. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the foam of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2A:
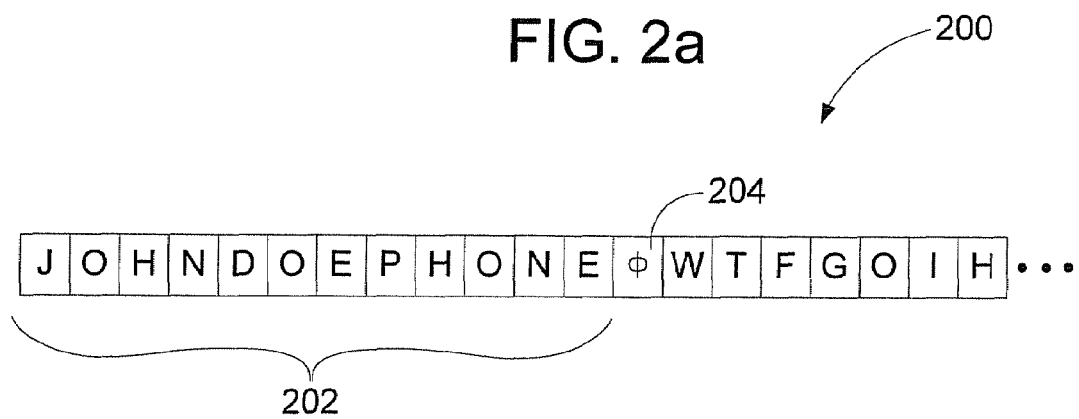
FIG. 2a is a block diagram of a friendly name field.

Turning now to FIG. 2a, the friendly name field 200 of a Bluetooth device is a UTF-8 (Uniform Transformation Format) encoded descriptive name 202 of the Bluetooth device. For example, the friendly name of a cellular phone could be "Joe's cellphone," a friendly name of a printer could be "Printer in Room 222 in Granger Laboratory" etc. The field length is 248 bytes long. If the name 202 is shorter than 248 bytes, the end of the name 202 is indicated by a null byte 204 (i.e., 0x00) and the bytes after the null byte do not have valid values.

It is unlikely that a Bluetooth device has a friendly name that is 248 bytes long. As a result, information can be embedded in the friendly name field 200 after the null byte. In one embodiment of the present invention, a marker is embedded into the friendly name field 200 after the null field of a name server. As used herein, a name server is a device that has the capability of storing or caching friendly names of other Bluetooth devices. A name server may be a computer 110, a cell-phone, laptop, server, workstation, camera, or any other type of Bluetooth device that can store friendly names of other Bluetooth devices.

Figure 2B:
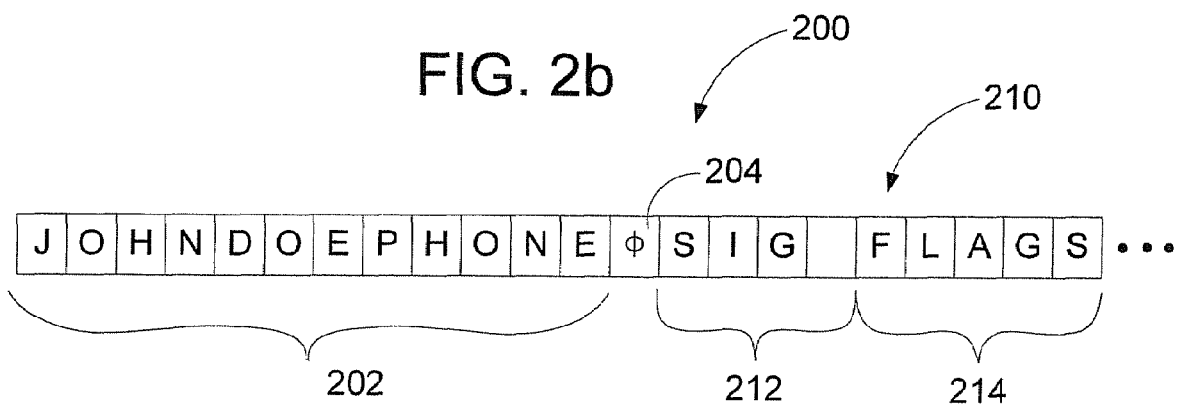
FIG. 2b is a block diagram of a friendly name field having a marker embedded therein in accordance with the teachings of the present invention.

Turning now to FIG. 2b, the marker 210 has a signature 212 of a predetermined number of bytes to indicate that a device is a name server. The marker 201 may also have a predetermined number of flags 214 to provide further information about the name server. These flags 214 may include, by way of example and not limitation, an indication of the time the name server has cached the friendly name of a device, a version number of the name server, up-time of the name server, server statistics, performance parameters, estimated remaining battery life, and the like.

Figure 3:
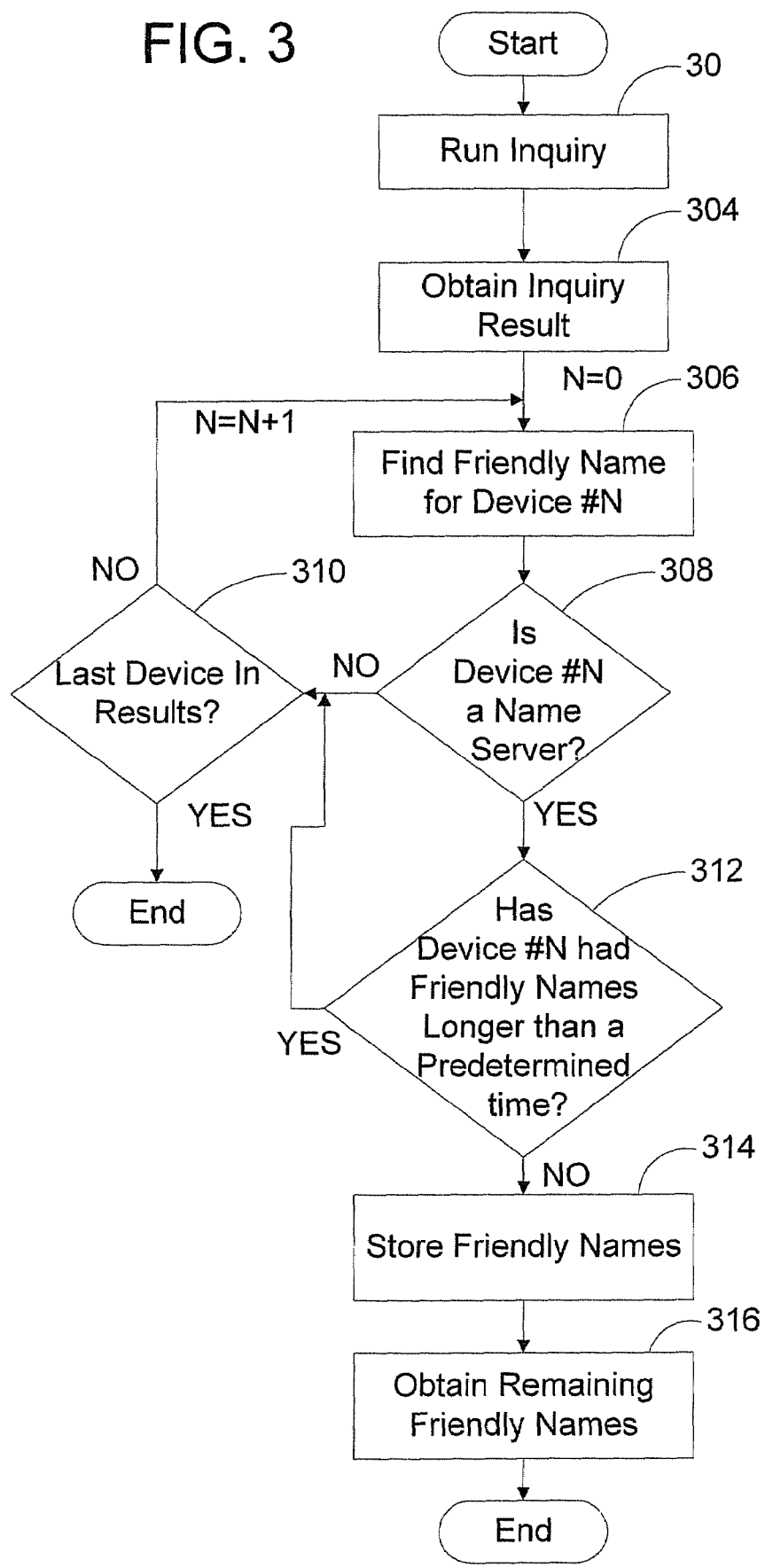
FIG. 3 illustrates a flow chart of a method of finding a name server in accordance with the teachings of the present invention.

One process of finding the name server using the marker is illustrated in FIG. 3. Turning now to FIG. 3, a device wanting to know which Bluetooth devices are in range runs an Inquiry (step 302). After the inquiry period expires, the device has received one or more Inquiry Results (step 304). The results contains the Bluetooth address for each Bluetooth device that responded and other information about each device including the class of device. With this information, the requesting device has a limited amount of information about the device. The limited amount of information provides the requesting device with the class of device (e.g., laptop, cellular phone, cordless phone, camcorder, video conferencing, joystick, scanner, etc.), page scan modes supported by the device, and clock offset.

Once the Inquiry Results are received, the requesting device searches for a name server. This is accomplished by requesting the friendly name of each Bluetooth device in the inquiry list until a name server is found. When a friendly name for a device is acquired (step 306), the requesting devices looks for the signature 212 indicating that the device is a name server (step 308). If the device does not have the name server signature, the requesting device requests the friendly name of the next Bluetooth device in the inquiry list and searches for the marker. This process is repeated until a name server is found. If no device in the list is a name server (step 310), the process ends because the requesting device will have requested the friendly names of each device that responded to the inquiry. The requesting device stores the friendly names it has acquired.

If a name server is found, the requesting device determines how long the name server has had the names. This is done by asking the name server for the friendly name of devices that are in the inquiry list. The name server provides the friendly name and the length of time it has had the friendly name. The length of time provides an indication of how old the data is, which can be used as an indication of the accuracy of the data. If the name server has cached the friendly names for a long time, the data the name server has stored has a higher probability of being outdated. The requesting device compares the length of time the name server has had the friendly names to a predetermined time (step 312). If the length of time is longer than or equal to the predetermined time, the friendly names the name server has are not used and the requesting device searches for another name server in the list by repeating steps 306-312.

Once a name server having friendly names for a time shorter than the predetermined time is found, the requesting device requests the friendly names for the addresses in the inquiry list and stores the friendly names (step 314). The name server only provides names for specific addresses. Alternatively, a name server could provide all friendly names and addresses it knows. However, those skilled in the art recognize that a name server that provides all friendly names and addresses it knows about would provide a requesting device with the capability to go from device to device, which could lead to a security breach in the network.

The requesting device then obtains the remaining friendly names of Bluetooth devices that are not cached by the name server (step 316). It should be recognized that the requesting device may only be interested in a particular class of device such as a printer. The requesting device could limit its friendly name search to the particular class of device or classes of devices in which it is interested. This can be done prior to finding a name server or after finding a name server.

Figure 4:
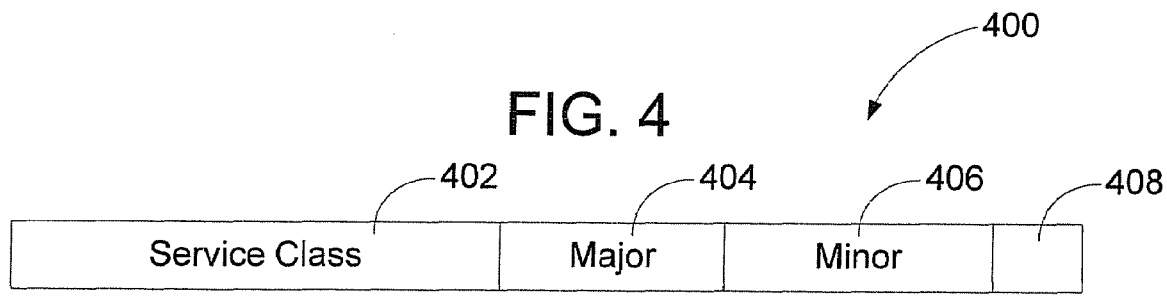
FIG. 4 is a block diagram of a class of device field of a Bluetooth device.

Other methods can be used to find a name server. For example, the class of device/service field that is returned by a responding device to an inquiry can be used to indicate that a device is a name server. Turning now to FIG. 4, the class of device/service field 400 consists of a service class entry 402, a major device class entry 404, a minor device class entry 406, and a format type entry 408. A field in any of the entries 402-406 can be used to indicate a device is a name server. For example, the service class entry 402 has two bits reserved. One of the two bits could be used to indicate a device that has name server capability. Alternatively, the major device class entry 404 or the minor class device entry 406 could be used to indicate that a device has name server capability.

Figure 5:
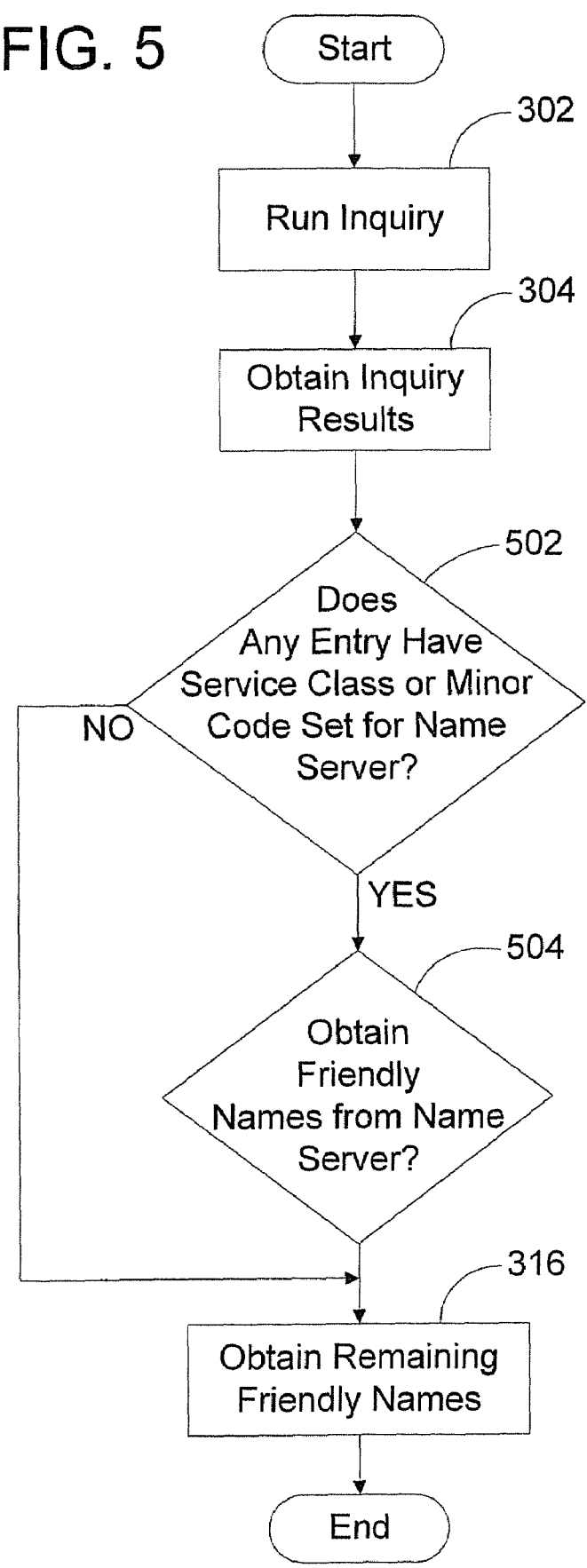
FIG. 5 illustrates a flow chart of an alternate method of finding a name server.

Turning now to FIG. 5, the steps taken to obtain friendly names using the class of device/service field 400 is illustrated. The requesting device runs an Inquiry (step 302) and receives one or more Inquiry Results (step 304). The requesting device searches the class of device/service field entries 400 to determine if any of the responding devices is a name server (step 502). If no name server responded to the Inquiry, the friendly names are obtained by requesting each device for its friendly name (step 316). If a name server is found, the requesting device determines how long the name server has had the friendly names to determine if friendly names should be acquired from the name server (step 504). If the name server has had the names for shorter than a predetermined period of time, the requesting device acquires the friendly names cached by the name server from the name server. The requesting device then obtains the remaining friendly names from each device that it does not have. If the name server has had the names for longer than or equal to the predetermined period of time, the requesting device does not acquire the friendly names from the name server. Instead, the requesting device obtains the remaining friendly names from each device that it does not have (step 316) or looks for another name server in the inquiry results and repeats steps 502, 504 and 316.

A method and apparatus to decrease the time to find friendly names of Bluetooth devices has been described. In an environment where there are a large number of Bluetooth devices present, a name server is likely to be found before all the friendly names of devices has been determined using the remote name request command. As a result, power consumption is conserved due to the decrease in transmission time. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Additionally, the concept of embedding a marker in the friendly name field for designating a name server may be extended to identifying other types of Bluetooth devices. Therefore, the invention as described herein contemplates all such embodiments as may come within the scope of the following claims and equivalents thereof.

We claim

1. A method to obtain a friendly name for each Bluetooth device responding to an inquiry, comprising:
    employing a processor to execute computer executable instructions stored on a computer storage medium to perform the following acts:
        issuing an inquiry command;
        identifying a name server among each Bluetooth device responding to the inquiry, wherein the name server is found by determining if the inquiry response contains a marker indicating that the Bluetooth device responding to the inquiry is a name server;
        obtaining friendly names for each Bluetooth device that responded to the inquiry and is cached on the name server; and
        requesting the friendly name of each remaining Bluetooth device that is not the name server.

2. The method of claim 1, further comprising:
    repeating the following acts until no more name servers are identified among each Bluetooth device responding to the inquiry:
        identifying an other name server among each Bluetooth device responding to the inquiry; and obtaining remaining undetermined friendly names for each Bluetooth device that responded to the inquiry and is cached on the other name server.

3. The method of claim 1, further comprising:
determining how long the name server has had the friendly names;
if the name server has had the friendly names longer than a predetermined time, performing the following acts:
identifying an other name server among the Bluetooth devices responding to the inquiry;
obtaining friendly names for Bluetooth devices that responded to the inquiry that are cached on the other name server;
determining how long the other name server has had the friendly names; and
repeating the preceding acts if the other name server has had the friendly names longer than the predetermined time.

4. The method of claim 1 wherein identifying a name server includes searching for the marker in the class of device/service field.

5. The method of claim 1 further comprising storing the friendly names.

6. The method of claim 4, wherein the marker is at least one of two bits reserved in a service class entry of the class of device/service field.

7. A method to find a name server, comprising:
employing a processor to execute computer executable instructions stored on a computer storage medium to perform the following acts:
issuing an inquiry command;
determining if a response from a Bluetooth device to the inquiry command contains a marker indicating that the Bluetooth device is a name server; and
if the response contains the marker, identifying the Bluetooth device as a name server.

8. The method of claim 7 further comprising the step requesting that the name server provide the friendly name of each Bluetooth device that responded to the inquiry command.

9. The method of claim 7 wherein the marker of a name server is in the class of device/service field.

10. The method of claim 9 wherein the marker is in at least one of a service class entry, a major device class entry, a minor device class entry, or a format type entry.

11. A system for obtaining a friendly name for each Bluetooth device responding to inquiry, comprising:
a processor that executes the following computer executable components stored on a computer storage medium:
an inquiry component that inquires for each Bluetooth device that is in range and creates an inquiry list of devices that responded to the inquiry; and
a requesting component that identifies a name server among each Bluetooth device responding to the inquiry, wherein the name server is found by determining if the response contains a marker indicating that the Bluetooth device responding to the inquiry is a name server; and wherein the requesting component then requests a list of friendly names from the name server for devices on the inquiry list.

12. The system of claim 11, wherein the request for a list of friendly names from the name server is only for a particular class of devices on the inquiry list.

13. The system of claim 11, further comprising a computer-storage medium having computer-executable instructions comprising:
a first portion of a data field containing data representing a class of device/service of a device; and
a second portion of the data field containing data for determining if the device has name server capability.

14. The system of claim 11 wherein the computer-storage medium further comprises a third portion of the data field containing flags for determining further information about the device.

15. The system of claim 14 wherein the flags include an indication of how long the device has had a list of friendly names if the device is a name server.

16. The system of claim 14 wherein the flags include a version number.

17. The system of claim 14 wherein the flags include an estimate of a remaining battery life of the device.

18. The system of claim 14 wherein the flags include an indication of an up-time of the device.

19. The system of claim 14 wherein the flags include server statistics if the device is a server.

20. The system of claim 11, further comprising a storage component for storing the friendly names of devices on the inquiry list.

* * * * *